United States Patent
Petr

(10) Patent No.: US 10,696,836 B2
(45) Date of Patent: Jun. 30, 2020

(54) THERMOPLASTIC COMPOSITIONS CONTAINING ACRYLIC COPOLYMERS AS MELT STRENGTH AND CLARITY PROCESS AIDS

(71) Applicant: Rohm and Haas Company, Collegeville, PA (US)

(72) Inventor: Michael T. Petr, Collegeville, PA (US)

(73) Assignee: Rohm and Haas Company, Philadelphia, PA (US)

(*) Notice: Subject to any disclaimer, the term of this patent is extended or adjusted under 35 U.S.C. 154(b) by 69 days.

(21) Appl. No.: 16/070,825

(22) PCT Filed: Jan. 19, 2017

(86) PCT No.: PCT/US2017/014083
§ 371 (c)(1),
(2) Date: Jul. 18, 2018

(87) PCT Pub. No.: WO2017/132046
PCT Pub. Date: Aug. 3, 2017

(65) Prior Publication Data
US 2019/0023889 A1 Jan. 24, 2019

Related U.S. Application Data

(60) Provisional application No. 62/287,199, filed on Jan. 26, 2016.

(51) Int. Cl.
| | | |
|---|---|---|
| C08L 27/06 | (2006.01) | |
| C08F 265/04 | (2006.01) | |
| C08L 51/00 | (2006.01) | |

(52) U.S. Cl.
CPC ............ *C08L 27/06* (2013.01); *C08F 265/04* (2013.01); *C08L 51/003* (2013.01); *C08F 2500/01* (2013.01); *C08F 2800/20* (2013.01); *C08L 2203/16* (2013.01); *C08L 2205/03* (2013.01)

(58) Field of Classification Search
CPC .... C08L 27/06; C08L 51/003; C08L 2203/16; C08L 2205/03; C08F 265/04; C08F 2500/01; C08F 2800/20
See application file for complete search history.

(56) References Cited

U.S. PATENT DOCUMENTS

| | | | | |
|---|---|---|---|---|
| 3,655,825 | A * | 4/1972 | Souder et al. | ........ C08F 265/06 |
| | | | | 525/82 |
| 3,833,686 | A * | 9/1974 | Grochowski et al. | ...................... |
| | | | | C08F 265/04 |
| | | | | 525/80 |
| 4,325,856 | A | 4/1982 | Ishikawa et al. | |
| 4,654,397 | A | 3/1987 | Mueller-Mall et al. | |
| 4,814,373 | A | 3/1989 | Frankel et al. | |
| 6,140,417 | A | 10/2000 | Nakanishi et al. | |
| 6,872,776 | B1 | 3/2005 | Iguchi et al. | |
| 2002/0072566 | A1 | 6/2002 | Wills et al. | |
| 2017/0183457 | A1 * | 6/2017 | Pirri et al. | ............ C08F 265/06 |

FOREIGN PATENT DOCUMENTS

| | | |
|---|---|---|
| AU | 613727 | 8/1991 |
| CA | 1340349 | 1/1999 |
| JP | 2813248 | 2/1991 |
| JP | 04266958 | 9/1992 |
| JP | 2006290991 | 10/2006 |
| WO | 2006112192 | 10/2006 |
| WO | 2008035929 | 3/2008 |
| WO | 2015108101 | 7/2015 |

OTHER PUBLICATIONS

J.P. Disson and S. Girois, J. Vinyl & Additive Tech., 9, No. 4, 177-185 (2003).

* cited by examiner

*Primary Examiner* — Nathan M Nutter

(57) ABSTRACT

Provided are thermoplastic polymer composition comprising (a) a polyvinyl halide, and (b) an acrylic copolymer comprising 70 to 100 weight % of a first polymeric stage, based on the total weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 70° C. or less, and wherein the acrylic copolymer has a molecular weight of greater than $1.5 \times 10^6$ g/mol.

8 Claims, No Drawings

THERMOPLASTIC COMPOSITIONS CONTAINING ACRYLIC COPOLYMERS AS MELT STRENGTH AND CLARITY PROCESS AIDS

FIELD OF THE INVENTION

This invention relates generally to acrylic polymers that are useful in thermoplastic polymer compositions. The acrylic polymers contain a polyvinyl halide and at least a first polymeric stage containing polymerized units derived from $C_1$-$C_6$ alkyl methacrylate monomers and $C_1$-$C_3$ alkyl acrylate monomers, and a calculated $T_g$ of 70° C. or less.

BACKGROUND

Acrylic process aids are a critical component of clear polyvinyl chloride ("PVC") formulations. Among other properties, they increase the melt strength so that the melt does not break when pulled during processing. In general, melt strength is proportional to the molecular weight of the process aid. Unfortunately, the haziness caused by the process aid in clear PVC is also proportional to the molecular weight of the process aid because higher molecular weight polymers are more difficult to disperse, which leads to an inhomogeneous melt. In turn, a tradeoff is always required between the properties of melt strength and clarity.

Process aids to increase melt strength have been utilized in the art. For example, WO 2008/035929 A1 discloses certain PVC process aids prepared by polymerizing a PVC seed with a monomer mixture to achieve improved gelation and inhibition of fish eye and flow mark effects during calendering. The prior art does not, however, disclose a process aid according to the present invention, which achieves simultaneous improvement in melt strength and clarity.

Accordingly, there is a need to develop PVC process aids that do not suffer from the drawbacks of the prior art, namely, that provide significant improvements in melt strength while also maintaining high clarity.

STATEMENT OF INVENTION

One aspect of the invention provides a thermoplastic polymer composition comprising (a) a polyvinyl halide, and (b) an acrylic copolymer comprising 70 to 100 weight % of a first polymeric stage, based on the total weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 70° C. or less, and wherein the acrylic copolymer has a molecular weight of $1.5 \times 10^6$ g/mol or more.

In another aspect, the invention provides thermoplastic polymer composition comprising (a) a polyvinyl chloride; and (b) a multi-stage acrylic copolymer comprising (i) 70 to 99.5 weight % of a first polymeric stage, based on the total weight of the multi-stage acrylic copolymer, comprising polymerized units derived from (A) 35 to 75 weight % of methyl methacrylate monomers, and (B) 25 to 65 weight % of one or more of butyl methacrylate and ethyl acrylate monomers, based on the total weight of monomers in the first polymeric stage, wherein the first polymeric stage has a calculated $T_g$ of from 35 to 70° C., and (ii) 0.5 to 30 weight % of a second polymeric stage, based on the total weight of the multi-stage acrylic copolymer, comprising polymerized units derived from one or more $C_1$-$C_4$ alkyl (meth)acrylate monomers, wherein the multi-stage acrylic copolymer has a molecular weight of from $1.5 \times 10^6$ to $3.5 \times 10^6$ g/mol.

Another aspect of the present invention provides a method for improving the melt strength and clarity of a thermoplastic polymer composition comprising a polyvinyl halide comprising adding an acrylic copolymer to the thermoplastic polymer composition, wherein the acrylic copolymer comprises 70 to 100 weight % of a first polymeric stage, based on the total weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 70° C. or less, and wherein the acrylic copolymer has a molecular weight of $1.5 \times 10^6$ g/mol or more.

In yet another aspect, the present invention provides an article of manufacture comprising a thermoplastic polymer composition comprising (a) a polyvinyl halide, and (b) an acrylic copolymer comprising 70 to 100 weight % of a first polymeric stage, based on the total weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 70° C. or less, and wherein the acrylic copolymer has a molecular weight of $1.5 \times 10^6$ g/mol or more. In certain embodiments, the article of manufacture is a film. In certain embodiments, the article of manufacture is a sheet.

DETAILED DESCRIPTION

The inventors have now surprisingly found that thermoplastic polymer compositions comprising a polyvinyl halide and an acrylic copolymer having a molecular weight of $1.5 \times 10^6$ g/mol or more and a first polymeric stage with a calculated $T_g$ of 70° C. or less provide significant improvements in melt strength while also maintaining high clarity. In certain embodiments, the acrylic copolymer comprises 70 to 100 weight % of a first polymeric stage, based on the total weight of the acrylic copolymer, wherein the first polymeric stage comprises polymerized units derived from one or more $C_1$-$C_6$ alkyl methacrylate monomers, $C_1$-$C_3$ alkyl acrylate monomers, and comonomers.

As used herein, the term "polymer" refers to a polymeric compound prepared by polymerizing monomers, whether of the same or a different type. The generic term "polymer" includes the terms "homopolymer," "copolymer," "terpolymer," and "resin." As used herein, the term "polymerized units derived from" refers to polymer molecules that are synthesized according to polymerization techniques wherein a product polymer contains "polymerized units derived from" the constituent monomers which are the starting materials for the polymerization reactions. As used herein, the term "(meth)acrylate" refers to either acrylate or methacrylate or combinations thereof, and the term "(meth)acrylic" refers to either acrylic or methacrylic or combinations thereof. As used herein, the term "substituted" refers to having at least one attached chemical group, for example, alkyl group, alkenyl group, vinyl group, hydroxyl group, carboxylic acid group, other functional groups, and combinations thereof. As used herein, the term "first polymeric stage" refers to any stage of the acrylic copolymer. It can be the only stage in a single stage polymer or the first, second, third, last, or any stage, chronologically, in a multi-stage polymer. As used herein, the term "second polymeric stage" refers to any other stage of the acrylic copolymer that is not the first stage. It can be the first, second, third, last, or any stage, chronologically, in a multi-stage polymer.

As used herein, the term "phr" means per hundred parts resin or polymer solids, and, unless otherwise indicated, refers to the polyvinyl halide. As used herein, the term "molecular weight" or "weight average molecular weight" or "$M_w$" refers to the weight average molecular weight of a polymer as measured by gel permeation chromatography ("GPC"), for acrylic polymers against polystyrene calibration standards following ASTM D5296-11 (2011), and using tetrahydrofuran ("THF") as the mobile phase and diluent.

As used herein, the terms "glass transition temperature" or "$T_g$" refers to the temperature at or above which a glassy polymer will undergo segmental motion of the polymer chain. Glass transition temperatures of a copolymer can be estimated by the Fox equation (*Bulletin of the American Physical Society*, 1 (3) Page 123 (1956)) as follows:

$$1/T_g = w_1/T_{g(1)} + w_2/T_{g(2)}$$

For a copolymer, $w_1$ and $w_2$ refer to the weight fraction of the two comonomers, and $T_g(1)$ and $T_g(2)$ refer to the glass transition temperatures of the two corresponding homopolymers made from the monomers. For polymers containing three or more monomers, additional terms are added ($w_n/T_{g(n)}$). The glass transition temperatures of the homopolymers may be found, for example, in the "Polymer Handbook," edited by J. Brandrup and E. H. Immergut, Interscience Publishers. The $T_g$ of a polymer can also be measured by various techniques, including, for example, differential scanning calorimetry ("DSC"). As used herein, the phrase "calculated $T_g$" shall mean the glass transition temperature as calculated by the Fox equation.

The inventive thermoplastic polymer compositions comprise a polyvinyl halide and an acrylic copolymer. In certain embodiments, the polyvinyl halide is present in the thermoplastic composition in an amount of from 50 to 99 weight %, preferably of from 80 to 98 weight %, and more preferably of from 90 to 98 weight %, based on the total weight of the thermoplastic composition. In certain embodiments, the acrylic copolymer is present in the thermoplastic composition in an amount of from 0.1 to 10 weight %, preferably of from 0.5 to 5 weight %, and more preferably of from 0.8 to 3 weight %, based on the total weight of the thermoplastic composition.

The polyvinyl halides of the inventive composition can be obtained by conventional suspension polymerization, emulsion polymerization, bulk polymerization, or solution polymerization in the presence of initiators. Suitable polyvinyl halides include, for example, polyvinyl chloride ("PVC"), chlorinated PVC ("CPVC"), polyvinylidenechloride ("PVDC"), polyvinylidenefluoride ("PVDF"), and polytetrafluoroethylene.

The acrylic copolymer of the inventive composition comprises a first polymeric stage comprising polymerized units derived from one or more $C_1$-$C_6$ alkyl methacrylate monomers and $C_1$-$C_3$ alkyl acrylate monomers. In certain embodiments, the first polymeric stage is present in the acrylic copolymer in an amount of from 70 to 100 weight %, preferably of from 75 to 95 weight %, and more preferably of from 80 to 90 weight %, based on the total weight of the acrylic copolymer. Suitable $C_1$-$C_6$ alkyl methacrylate monomers and $C_1$-$C_3$ alkyl acrylate monomers include, for example, methyl (meth)acrylate, ethyl (meth)acrylate, propyl (meth) acrylate, butyl methacrylate, pentyl methacrylate, and hexyl methacrylate. Preferably, the $C_1$-$C_6$ alkyl methacrylate monomers and $C_1$-$C_3$ alkyl acrylate monomers comprise one or more of methyl methacrylate, ethyl acrylate, and butyl methacrylate. In certain embodiments, the $C_1$-$C_6$ alkyl methacrylate monomers and $C_1$-$C_3$ alkyl acrylate monomers are present in the first polymeric stage in an amount of at least 85 weight %, or at least 90 weight %, or at least 95 weight %, or 100 weight %, based on the total weight of monomers in the first polymeric stage.

In certain embodiments, the first polymeric stage comprises polymerized units derived from methyl methacrylate monomers in an amount of from 35 to 75 weight %, preferably of from 40 to 70 weight %, and more preferably of from 50 to 65 weight %, based on the total weight of monomers in the first polymeric stage. In certain embodiments, the first polymeric stage comprises polymerized units derived from one or more $C_2$-$C_6$ alkyl methacrylate monomers and $C_1$-$C_3$ alkyl acrylate monomers in an amount of from 25 to 65 weight %, preferably of from 30 to 60 weight %, and more preferably of from 30 to 55 weight %, based on the total weight of monomers in the first polymeric stage. Preferably, the $C_2$-$C_6$ alkyl methacrylate monomers and $C_1$-$C_3$ alkyl acrylate monomers comprise one or more of ethyl acrylate and butyl methacrylate.

In certain embodiments, the first polymeric stage further comprises one or more co-monomers other than $C_1$-$C_6$ alkyl methacrylate monomers and $C_1$-$C_3$ alkyl acrylate monomers. Suitable co-monomers include, for example, $C_4$-$C_{18}$ alkyl acrylates, $C_7$-$C_{18}$ alkyl methacrylates, $C_1$-$C_{18}$ alkyl (meth)acrylamides, dienes (e.g., butadiene), isoprene, (meth)acrylic acid, substituted $C_1$-$C_{18}$ alkyl (meth)acrylates (e.g., hydroxyethyl (meth)acrylate), styrene, substituted styrenes (e.g., alpha methyl styrene), vinyl alcohols, vinyl ethers, vinyl esters (e.g., vinyl acetate), vinyl halides (e.g., vinyl chloride), and vinyl nitriles (e.g., acrylonitrile). In certain embodiments, the one or more co-monomers comprises butyl acrylate. In certain embodiments, the co-monomers are present in the first polymeric stage in an amount of no more than 15 weight %, or no more than 10 weight %, or no more than 5 weight %, based on the total weight of monomers in the first polymeric stage.

The first polymeric stage of the acrylic copolymer of the inventive compositions has a calculated $T_g$ of 70° C. or less, or 65° C. or less, or 60° C. or less. In certain embodiments, the first polymeric stage has a calculated $T_g$ of 35° C. or more, or 40° C. or more, or 45° C. or more.

In certain embodiments, the acrylic copolymer of the inventive composition further comprises a second polymeric stage. The first and second polymeric stages may be layered in any particular order. In certain embodiments, the second polymeric stage is present in the acrylic copolymer in an amount of from 0.5 to 30 weight %, preferably of from 5 to 25 weight %, and more preferably of from 10 to 20 weight %, based on the total weight of the acrylic copolymer. The second polymeric stage comprises polymerized units derived from one or more $C_1$-$C_{18}$ alkyl (meth)acrylates, $C_1$-$C_{18}$ alkyl (meth)acrylamides, dienes (e.g., butadiene), isoprene, (meth)acrylic acid, substituted $C_1$-$C_{18}$ alkyl (meth) acrylates (e.g., hydroxyethyl (meth)acrylate), styrene, substituted styrenes (e.g., alpha methyl styrene), vinyl alcohols, vinyl ethers, vinyl esters (e.g., vinyl acetate), vinyl halides (e.g., vinyl chloride), and vinyl nitriles (e.g., acrylonitrile). Preferably, the second polymeric stage comprises one or more of methyl methacrylate, ethyl acrylate, butyl acrylate, and butyl methacrylate. In certain embodiments, the second polymeric stage comprises polymerized units derived from one or more $C_1$-$C_6$ alkyl methacrylate monomers and $C_1$-$C_3$ alkyl acrylate monomers in an amount of from 25 to 100 weight %, preferably of from 45 to 100 weight %, and more preferably of from 65 to 100 weight %. In certain embodiments, the second polymeric stage comprises one or more of methyl methacrylate, butyl methacrylate, and ethyl acrylate. In certain embodiments, the second polymeric stage has a $T_g$ of below 30° C., preferably below 10° C.

The acrylic copolymers described herein provide improved properties to the inventive thermoplastic compositions including, for example, maintaining a high melt strength while also providing a haze that is reduced compared to that which is otherwise associated with such high melt strengths. Melt strength is proportional to the molecular weight of a process aid. See, e.g., J. P. Disson and S. Girois, J. *Vinyl & Additive Tech.*, 9, No. 4, 177-185 (2003). Polymer molecular weights can be measured by standard methods such as, for example, gel permeation chromatograph ("GPC"). In certain embodiments, the acrylic copolymers of the present invention have a weight average molecular weight ($M_w$) of $1.5 \times 10^6$ g/mol or more, or $2.0 \times 10^6$ g/mol or more. In certain embodiments, the acrylic copolymers of the present invention have a weight average molecular weight ($M_w$) of $3.5 \times 10^6$ g/mol or less, or $3.0 \times 10^6$ g/mol or less, or $2.5 \times 10^6$ g/mol or less.

The thermoplastic polymer compositions of the present invention provide improvements in terms of reduced haze. According to the standards of the ASTM (American Society for Testing and materials), haze is defined as percentage of light that, during transmission through a sample, deviates by more than 2.5 degrees from the direction of the incoming beam of light. In certain embodiments, the thermoplastic polymer compositions of the present invention are characterized by transmitted haze levels of 2.6% or less, preferably less 2.4% or less, more preferably 2.2% or less, and even more preferably 2.0% or less, as tested using a BYK Gardner Haze-Gard instrument.

In general, the acrylic copolymers are formed by aqueous emulsion or suspension polymerization in the presence of an initiator, such as a thermal initiator like a peracid, e.g., persulfate, or a peroxide, or a redox pair, such as a peracid or peroxide and a reducing agent like a bisulfite or an organic sulfoxylate. Such polymerization methods are conventional in the art such as, for example, U.S. Pat. Nos. 4,325,856, 4,654,397, and 4,814,373. In multi-stage polymerization processes, at least two stages differing in composition or molecular weight are formed in a sequential fashion.

In emulsion or suspension polymerization, monomer mixture(s) may be added neat or as an emulsion in water. In suspension polymerization, no surfactant or emulsifier is used. Such monomer mixtures may be added as a shot or fed, as in gradual addition polymerization. A monomer mixture may be added in one or more additions and may be added continuously over all or part the reaction period or not continuously, such as over all or part of the reaction period. One or more monomer mixture can be added linearly, such as in the case of gradual addition (grad add), or not, such as, for example, in semi-continuous polymerization or addition all at once as a "shot", or in any combination thereof.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. The amount of surfactant used is usually 0.1% to 6% by weight, based on the weight of monomer, or higher to make a higher $M_w$ polymer stage.

The same surfactants and amounts thereof are used in both single stage and in multi-stage emulsion polymerization processes. Either thermal or redox initiation processes may be used in either single stage or multi-stage emulsion polymerization processes. Known free radical initiators such as, for example, peroxides, ammonium and/or alkali persulfates or redox pairs, may be used at a level of from 0.01 to 3.0 weight %, based on the weight of total monomer, or lower to make a higher $M_w$ polymer stage. Redox systems using the same initiators may be coupled with a suitable reductant such as, for example, (iso)ascorbic acid, alkali metal and ammonium salts of sulfur-containing acids, such as sodium sulfite, bisulfite, formadinesulfinic acid, hydroxymethanesulfonic acid, sodium sulfoxylate formaldehyde, 2-hydroxy-2-sulfinatoacetic acid, 2-hydroxy-2-sulfonatoacetic acid, amines such as ethanolamine, glycolic acid, glyoxylic acid hydrate, lactic acid, glyceric acid, malic acid, tartaric acid and salts of the preceding acids. Mercaptans, such as mercaptopropionic acid or methyl-3-mercaptopropionate, also find use as chain transfer agents and so can be used in the present invention at 0.1% or less, based on the weight of total monomer, in order to reduce the molecular weight.

To make higher $M_w$ polymers or polymer stages, one or more monomer mixtures should be added as a "shot" to the reactor or initially charged in the reactor at the beginning of one or more reaction stage.

Preferably, to make a high $M_w$ polymer stage, one can start the polymerization reaction cold or at room temperature, use a compatible seed polymer, lower the concentration of initiator, raise the concentration of surfactants or emulsifiers, use a redox pair as a radical initiator, or any combination thereof. More preferably, one starts the polymerization reaction cold or at room temperature and either uses shot polymerization and/or a redox initiator.

Chain transfer agents may be used to lower the molecular weight of the formed polymer and may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexylmercaptan, n-dodecyl mercaptan, tert-dodecyl mercaptan, and mixtures thereof. Suitable amounts of chain transfer agents may range up to 0.1 weight %, based on the total solids weight of all monomers, preferably less than 0.05 weight %, and more preferably less than 0.01 weight %.

The multi-stage acrylic copolymers are isolated by coagulation or spray drying to form a powder. Coagulation can be carried out by various coagulation methods known in the art, such as aqueous electrolyte (salt) coagulation using an aqueous solution of a salt of an inorganic acid, such as sodium chloride, magnesium acetate, calcium hypophosphite. Preferably, the electrolyte solution is prepared with a salt containing a divalent cation, such as calcium chloride ($CaCl_2$). Coagulation with a water soluble, or partially water soluble solvent, such as methanol and the like ("methanol-coagulation") is also possible.

Preferably, in aqueous electrolyte coagulation, the aqueous electrolyte solution has a concentration of from 0.01 and 2.0, preferably from 0.1 to 0.5 weight %. It is also important to control the coagulation temperature because too high a coagulation temperature results in excessively large particles causing poor dispersion. In contrast, too low a temperature results in excessively small particles resulting in a wide particle size span and excessive dust. Coagulation temperature may range of from 40° C. to 85° C., but preferably less than 70° C. The resulting coagulated slurry should have a percent solids weight fraction in the range of from 10% to 90%, preferably from 40% to 75%, and most preferably from 50% to 65%.

The resulting coagulated slurry is dried to less than 5 weight percent water to form a free-flowing powder. Various methods of drying particle slurries are readily known to those skilled in the art and are described in *Chemical Engineer's Handbook*, 5th Ed., Perry and Chilton, Eds. 1973, which relates to the drying of solid-liquid particle dispersions. The preferred drying methods include fluidized bed dryers, rotary dryers, spray dryers, continuous or batch tray dryers, flash dryers, and pneumatic conveying dryers. During the drying step it is important to control the drying temperature so that the slurry particles do not fuse among themselves, for example by keeping the temperature of the slurry particles below the $T_g$ of the first polymeric stage of the polymer particles. If the drying temperature is too high then the individual polymer particles may fuse together in the powder particles which may hinder their subsequent dispersion into thermoplastic matrices. A free-flowing, low-dust polymeric additive powder is achieved when the water content is less than 5 weight %, preferably less than 3 weight %, most preferably less than 1 weight %, of the powder.

Another variation of the present invention includes adding one or more other known multi-stage acrylic copolymer compositions, in either powder or aqueous slurry form. These additives can be blended into the composition after the final coagulation step or formation of wetcake using standard equipment such as high-speed mixers, blenders, kneaders, extruders, fluidized drying beds, spray nozzles, and the like as mixing equipment.

Other ingredients typically blended in thermoplastic formulations, such as lubricants, thermal stabilizers, waxes, dyes, pigments, fillers, and the like, may each have an aqueous solution, liquid, powdered, or pellet form, and may be included in the present invention using this mixing equipment. The amount of optional ingredients effective for achieving the desired property provided by such ingredients can be readily determined by one skilled in the art.

The polymeric additive powders of the present invention may be used in various ways, including preparation of thermoplastic polymer compositions. The thermoplastic polymer compositions of the present invention contain a vinyl halide polymer and the polymeric additive powder of the present invention. These blends are readily prepared by melt-blending methods that are known in the art of plastics processing. For example, the polymeric additive powders of the present invention can be blended with vinyl halide polymer powders or pellets and melt processed using an extruder.

The multi-stage acrylic copolymers of the present invention find use in processing of vinyl halide polymers or, preferably, vinyl chloride polymers, as well as chlorinated polyvinyl chloride, and so-called "barrier resins" containing, in copolymerized form, vinylidene chloride, acrylonitrile. The thermoplastic polymer compositions of the present invention can also be blended with higher amounts of the polymeric additives powders of the present invention for preparing concentrated pellets of the polymeric additive powders of the present invention. The thermoplastic polymer compositions of the present invention may also be formed into pellets by the steps of blending, extruding and pelletizing using conventional plastics processing equipment.

As noted above, the acrylic copolymers described herein are highly effective process aids for improving melt strength and clarity in the inventive thermoplastic polymer compositions. They exhibit melt strength that is on par with, if not better than, previously known thermoplastic polymer compositions, without the disadvantage of a high haze level. Thus, in one aspect, the present invention provides a method for improving the melt strength and clarity of a thermoplastic polymer composition comprising a polyvinyl halide, comprising adding an acrylic copolymer to the thermoplastic polymer composition, wherein the acrylic copolymer comprises 70 to 100 weight % of a first polymeric stage, based on the total solids weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 70° C. or less, and wherein the acrylic copolymer has a molecular weight of $1.5 \times 10^6$ g/mol or more.

The thermoplastic polymer compositions of the present invention have many uses, including calendered sheet, thermoformed sheet, injection molded articles, blow molded articles, extruded articles, films, and the like.

Some embodiments of the invention will now be described in detail in the following Examples.

EXAMPLES

Example 1

Preparation of Exemplary and Comparative Copolymers

Exemplary acrylic copolymers in accordance with the present invention and comparative copolymers contain the components recited in Table 1.

TABLE 1

Exemplary Acrylic Copolymers and Comparative Copolymers

| Sample | Monomer (wt %) | $T_g$ (° C.) |
|---|---|---|
| E1 | Stage 1 (85%): 50 MMA/50 BMA | 60 |
|  | Stage 2 (15%): 35 MMA/45 BA/20 BMA | 4 |
| E2 | Stage 1 (85%): 65 MMA/10 BA/25 BMA | 60 |
|  | Stage 2 (15%): 35 MMA/45 BA/20 BMA | 4 |
| E3 | Stage 1 (85%): 50 MMA/50 BMA | 60 |
|  | Stage 2 (15%): 100 BMA | 25 |
| E4 | Stage 1 (85%): 74 MMA/26 EA | 61 |
|  | Stage 2 (15%): 25 MMA/75 EA | 0 |
| E5 | Stage 1 (85%): 65 MMA/10 BA/25 BMA | 60 |
|  | Stage 2 (15%): 35 MMA/45 BA/20 BMA | 4 |
| E6 | Stage 1 (85%): 50 MMA/50 BMA | 60 |
|  | Stage 2 (15%): 35 MMA/45 BA/20 BMA | 4 |
| E7 | Stage 1 (85%): 44.8 MMA/5.2 BA/50 BMA | 50 |
|  | Stage 2 (15%): 35 MMA/45 BA/20 BMA | 4 |
| E8 | Stage 1 (85%): 39.3 MMA/10.7 BA/50 BMA | 40 |
|  | Stage 2 (15%): 35 MMA/45 BA/20 BMA | 4 |
| E9 | Stage 1 (85%): 62 MMA/38 BMA | 70 |
|  | Stage 2 (15%): 35 MMA/45 BA/20 BMA | 4 |
| C1* | Stage 1 (85%): 90 MMA/5 BA/5 BMA | 88 |
|  | Stage 2 (15%): 35 MMA/45 BA/20 BMA | 4 |
| C2* | Stage 1 (100%): 90 MMA/10 BA | 81 |
| C3* | Stage 1 (85%): 50 MMA/50 BMA | 60 |
|  | Stage 2 (15%): 100 BMA | 25 |
| C4* | Stage 1 (85%): 80 MMA/20 BA | 59 |
|  | Stage 2 (15%): 100 BMA | 25 |

TABLE 1-continued

Exemplary Acrylic Copolymers and Comparative Copolymers

| Sample | Monomer (wt %) | $T_g$ (° C.) |
|---|---|---|
| C5* | Stage 1 (85%): 75 MMA/25 BMA | 81 |
| | Stage 2 (15%): 35 MMA/45 BA/20 BMA | 4 |

MMA = methyl methacrylate
BA = butyl acrylate
BMA = butyl methacrylate
EA = ethyl acrylate
*Comparative Exemplary acrylic copolymers E1-E9 in accordance with the present invention, and comparative copolymers C1-C5, were synthesized with appropriate changes in monomer amounts as recited in Table 1 as follows. Synthesis was via conventional aqueous emulsion polymerization in a 5 L glass reactor equipped with stirring and under Nitrogen gas sparging, along with either a 28 weight % sodium lauryl sulfate (SLS) surfactant solution in water, or a 24 weight % sodium dodecylbenzenesulfonate (DS-4) surfactant solution in water, and, as redox initiator, sodium formaldehyde sulfoxylate (SFS), tert-butyl hydroperoxide (tBHP), tartaric acid, and chelated iron, was utilized. In polymerization to make the first polymeric stage, half of the monomer indicated in Table 1 was charged in the first shot. No heat was supplied to the kettle, and the temperature was allowed to rise to its maximum point, after which it did not rise for 5 minutes. At this time the reactor was cooled to begin the second shot. In the polymerization of the second shot, the remaining half of the monomer indicated in Table 1 was charged in the second shot. No heat was supplied to the kettle, and the temperature was allowed to rise to its maximum point, after which it did not rise for 5 minutes. At this time the reactor was cooled to begin the second polymeric stage. In the polymerization of the second polymeric stage, all of the monomer indicated in Table 1 was charged in one shot. No heat was supplied to the kettle, and the temperature was allowed to rise to its maximum point, after which it did not rise for 5 minutes. After polymerization, more SFS and tBHP were fed to reduce the residual monomer and then, if SLS was used in the polymerization, 1 solids weight % of a 28 weight % DS-4 surfactant solution in water was added. The resulting polymer had 38 weight % solids content.

The $T_g$ of each polymeric stage reported in Table 1 was calculated by the Fox equation (*Bulletin of the American Physical Society*, 1 (3) Page 123 (1956)) as follows:

$$1/T_g = w_1/T_{g(1)} + w_2/T_g(2)$$

For a copolymer, $w_1$ and $w_2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n/T_{g(n)}$).

Example 2

Molecular Weight Characterization of Exemplary and Comparative Copolymers

Exemplary acrylic copolymer in accordance with the present invention and comparative copolymers, all as synthesized in Example 1, were evaluated for molecular weight as shown in Table 2.

TABLE 2

Molecular Weight Characterization

| Sample | Molecular Weight ($10^6$ g/mol) |
|---|---|
| E1 | 2.90 |
| E2 | 2.28 |
| E3 | 2.58 |
| E4 | 2.18 |
| E5 | 3.12 |
| E6 | 1.63 |
| E7 | 1.97 |
| E8 | 2.25 |
| E9 | 1.75 |
| C1 | 1.82 |
| C2 | 1.05 |
| C3 | 1.07 |
| C4 | 2.05 |
| C5 | 2.88 |

The molecular weight was determined by gel permeation chromatography (GPC) on an Agilent 1100 Series High Pressure Liquid Chromatograph (HPLC) with two 20 μm MIXED-A columns using tetrahydrofuran as the mobile phase and diluent at 1 mL/min and room temperature.

Example 3

Preparation of Exemplary Polyvinyl Chloride Formulations

Exemplary polyvinyl chloride formulations in accordance with the present invention containing exemplary acrylic copolymers E1-E9, as synthesized in Example 1, contain the components recited in Table 3.

TABLE 3

Exemplary Polyvinyl Chloride Formulations

| Material | PVC-E1 (phr) | PVC-E2 (phr) | PVC-E3 (phr) | PVC-E4 (phr) | PVC-E5 (phr) | PVC-E6 (phr) | PVC-E7 (phr) | PVC-E8 (phr) | PVC-E9 (phr) |
|---|---|---|---|---|---|---|---|---|---|
| PVC F 614+ (K = 58) | 100 | 100 | 100 | 100 | 100 | 100 | 100 | 100 | 100 |
| TM 181++ (methyl tin thermal stabilizer) | 1.2 | 1.2 | 1.2 | 1.2 | 1.2 | 1.2 | 1.2 | 1.2 | 1.2 |
| F-1060L++ (ester internal lubricant) | 0.4 | 0.4 | 0.4 | 0.4 | 0.4 | 0.4 | 0.4 | 0.4 | 0.4 |
| E-2100++ (ester internal lubricant) | 0.5 | 0.5 | 0.5 | 0.5 | 0.5 | 0.5 | 0.5 | 0.5 | 0.5 |

TABLE 3-continued

Exemplary Polyvinyl Chloride Formulations

| Material | PVC-E1 (phr) | PVC-E2 (phr) | PVC-E3 (phr) | PVC-E4 (phr) | PVC-E5 (phr) | PVC-E6 (phr) | PVC-E7 (phr) | PVC-E8 (phr) | PVC-E9 (phr) |
|---|---|---|---|---|---|---|---|---|---|
| E1 | 1.0 | — | — | — | — | — | — | — | — |
| E2 | — | 1.0 | — | — | — | — | — | — | — |
| E3 | — | — | 1.0 | — | — | — | — | — | — |
| E4 | — | — | — | 1.0 | — | — | — | — | — |
| E5 | — | — | — | — | 1.0 | — | — | — | — |
| E6 | — | — | — | — | — | 1.0 | — | — | — |
| E7 | — | — | — | — | — | — | 1.0 | — | — |
| E8 | — | — | — | — | — | — | — | 1.0 | — |
| E9 | — | — | — | — | — | — | — | — | 1.0 |
| Total | 102.1 | 102.1 | 102.1 | 102.1 | 102.1 | 102.1 | 102.1 | 102.1 | 102.1 |

+Available from Formosa Industries, TW
++Available from PMC Group

The exemplary polyvinyl chloride formulations were prepared by adding the materials in Table 3 sequentially. A master batch was prepared in around 20 minutes by adding the PVC at room temperature to a Gunther Papenmeier/Welex blender, ramping the power to 15 A, adding the TM 181 at 52° C., adding the F-1060L and then the E2100 at 66° C., continuing until to 100° C., and slowly reducing power and cooling to 50° C. After blending, 1 g of acrylic copolymer was added to 102.1 g of the master batch and hand shaken in a bag to mix. The resulting 103.1 g of the formulated PVC with acrylic copolymer was milled at 195° C. for 3 minutes on en electric Collin Roll mill with a 0.3 mm gap and the front and back rolls running at 13 rpm and 10 rpm, respectively. Samples were cut from a 0.3 mm thick and visually transparent section of the resulting PVC sheet.

Example 4

Preparation of Comparative Polyvinyl Chloride Formulations

Comparative polyvinyl chloride formulations containing comparative copolymers C1-C5, as synthesized in Example 1, contain the components recited in Table 4.

TABLE 4

Comparative Polyvinyl Chloride Formulations

| Material | PVC-C1 (phr) | PVC-C2 (phr) | PVC-C3 (phr) | PVC-C4 (phr) | PVC-C5 (phr) |
|---|---|---|---|---|---|
| PVC F 614+ (K = 58) | 100 | 100 | 100 | 100 | 100 |
| TM 181++ (methyl tin thermal stabilizer) | 1.2 | 1.2 | 1.2 | 1.2 | 1.2 |
| F-1060L++ (ester internal lubricant) | 0.4 | 0.4 | 0.4 | 0.4 | 0.4 |
| E-2100++ (ester internal lubricant) | 0.5 | 0.5 | 0.5 | 0.5 | 0.5 |
| C1 | 1.0 | — | — | — | — |
| C2 | — | 1.0 | — | — | — |
| C3 | — | — | 1.0 | — | — |
| C4 | — | — | — | 1.0 | — |
| C5 | — | — | — | — | 1.0 |
| Total | 102.1 | 102.1 | 102.1 | 102.1 | 102.1 |

+Available from Formosa Industries, TW
++Available from PMC Group

The comparative polyvinyl chloride formulations were prepared by adding the materials in Table 4 sequentially. A master batch was prepared in around 20 minutes by adding the PVC at room temperature to a Gunther Papenmeier/Welex blender, ramping the power to 15 A, adding the TM 181 at 52° C., adding the F-1060L and then the E2100 at 66° C., continuing until to 100° C., and slowly reducing power and cooling to 50° C. After blending, 1 g of acrylic copolymer was added to 102.1 g of the master batch and hand shaken in a bag to mix. The resulting 103.1 g of the formulated PVC with acrylic copolymer was milled at 195° C. for 3 minutes on en electric Collin Roll mill with a 0.3 mm gap and the front and back rolls running at 13 rpm and 10 rpm, respectively. Samples were cut from a 0.3 mm thick and visually transparent section of the resulting PVC sheet.

Example 5

Haze Characterization of Exemplary and Comparative PVC Formulations

Exemplary and comparative PVC formulations as prepared in Examples 2 and 3, respectively, were evaluated for haze level as shown in Table 5.

TABLE 5

Haze Characterization

| Sample | Haze (%) |
|---|---|
| PVC-E1 | 2.32 |
| PVC-E2 | 2.29 |
| PVC-E3 | 1.99 |
| PVC-E4 | 2.31 |
| PVC-E5 | 2.54 |
| PVC-E6 | 2.08 |
| PVC-E7 | 1.98 |
| PVC-E8 | 1.95 |

TABLE 5-continued

Haze Characterization

| Sample | Haze (%) |
|---|---|
| PVC-E9 | 2.05 |
| PVC-C1 | 2.85 |
| PVC-C2 | 2.43 |
| PVC-C3 | 1.95 |
| PVC-C4 | 2.79 |
| PVC-C5 | 2.82 |

The haze of each PVC sample was measured on pieces of the formulated PVC sheets as prepared in Examples 3 and 4. Three haze measurements were recorded using a calibrated BYK Gardner Haze-Guard Plus instrument in transmission with 0° C. illumination and diffuse viewing following ASTM D-1003 and averaged for the haze values reported in Table 5. The results in Tables 2 and 5 demonstrate that the inventive examples PVC-E1 through PVC-E9 containing acrylic copolymers in accordance with the present invention provide PVC formulations exhibiting far superior haze values while maintaining a high melt strength, which is proportional to molecular weight of acrylic copolymer additives, when compared to PVC formulations prepared from comparative copolymer additives.

Comparative example PVC-C1 shows that a high molecular weight copolymer additive results in high haze (i.e., more than 2.6%). Comparative examples PVC-C2 and PVC-C3 show that the low molecular weight acrylic copolymers provide low haze, but conversely would lead to low melt strength because of the low molecular weight. Comparative example PVC-C4 shows that, even with a low $T_g$ (i.e., 70° C. or less), an acrylic copolymer having low compatibility (i.e., an acrylic copolymer having a first polymeric stage derived from less than 85 weight % of one or more $C_1$-$C_6$ alkyl methacrylate monomers and $C_1$-$C_3$ alkyl acrylate monomers) leads to high haze (i.e., more than 2.6%). Comparative example PVC-C5 shows that, even with high compatibility (i.e., an acrylic copolymer having a first polymeric stage derived from more than 85 weight % of one or more $C_1$-$C_6$ alkyl methacrylate monomers and $C_1$-$C_3$ alkyl acrylate monomers), an acrylic copolymer having a high $T_g$ (i.e., more than 70° C.) will still produce high haze (i.e., more than 2.6%).

Accordingly, the inventive thermoplastic polymer compositions demonstrate a haze level of 2.6% or less, while including an acrylic copolymer additive having a molecular weight of $1.5 \times 10^6$ g/mol or more, wherein the first polymeric stage of the acrylic copolymer is derived from more than 85 weight % of one or more $C_1$-$C_6$ alkyl methacrylate monomers and $C_1$-$C_3$ alkyl acrylate monomers and has a $T_g$ of 70° C. or less.

What is claimed is:

1. A thermoplastic polymer composition comprising:
   (a) a polyvinyl halide; and
   (b) an acrylic copolymer comprising
   (i) 70 to 99.5 weight % of a first polymeric stage, based on the total weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of from 25° C. to less than 60° C., and
   (ii) 0.5 to 30 weight % of a second polymeric stage, based on the total weight of the acrylic copolymer, comprising polymerized units derived from one or more $C_1$-$C_{18}$ alkyl (meth)acrylates, wherein the second polymeric stage has a $T_g$ of below 30° C.,
   wherein the acrylic copolymer has a weight average molecular weight of $1.5 \times 10^6$ g/mol or more.

2. The thermoplastic polymer composition of claim 1, wherein the first polymeric stage comprises (i) 35 to 75 weight % of methyl methacrylate monomers, and (ii) 25 to 65 weight % of one or more $C_2$-$C_6$ alkyl methacrylate monomers and $C_1$-$C_3$ alkyl acrylate monomers, based on the total weight of monomers in the first polymeric stage.

3. The thermoplastic polymer composition of claim 2, wherein the $C_2$-$C_6$ alkyl methacrylate monomers and $C_1$-$C_3$ alkyl acrylate monomers of the first polymeric stage comprise one or more of butyl methacrylate and ethyl acrylate.

4. The thermoplastic polymer composition of claim 1, wherein the second polymeric stage comprises polymerized units derived from one or more $C_1$-$C_4$ alkyl (meth)acrylate monomers.

5. The thermoplastic polymer composition of claim 1, wherein the first polymeric stage is present in an amount of from 70 to 99.5 weight %, and the second polymeric stage is present in an amount of from 0.5 to 30 weight %, based on the total weight of the acrylic copolymer.

6. A thermoplastic polymer composition comprising:
   (a) a polyvinyl chloride; and
   (b) a multi-stage acrylic copolymer comprising
   (i) 70 to 99.5 weight % of a first polymeric stage, based on the total weight of the multi-stage acrylic copolymer, comprising polymerized units derived from (A) 35 to 75 weight % of methyl methacrylate monomers, and (B) 25 to 65 weight % of one or more of butyl methacrylate and ethyl acrylate monomers, based on the total weight of monomers in the first polymeric stage, wherein the first polymeric stage has a calculated $T_g$ of from 35 to less than 60° C., and
   (ii) 0.5 to 30 weight % of a second polymeric stage, based on the total weight of the multi-stage acrylic copolymer, comprising polymerized units derived from one or more $C_1$-$C_4$ alkyl (meth)acrylate monomers,
   wherein the multi-stage acrylic copolymer has a weight average molecular weight of from $1.5 \times 10^6$ to $3.5 \times 10^6$ g/mol.

7. A method for improving the melt strength and clarity of a thermoplastic polymer composition comprising a polyvinyl halide comprising adding an acrylic copolymer to the thermoplastic polymer composition, wherein the acrylic copolymer comprises (i) 70 to 100 weight % of a first polymeric stage, based on the total solids weight of the acrylic copolymer, comprising polymerized units derived from at least 85 weight % of one or more $C_1$-$C_6$ alkyl methacrylate monomers and $C_1$-$C_3$ alkyl acrylate monomers, based on the total weight of monomers in the first polymeric stage, wherein the first polymeric stage has a calculated $T_g$ of 25° C. to less than 60° C., and (ii) 0.5 to 30 weight % of a second polymeric stage, based on the total weight of the acrylic copolymer, comprising polymerized units derived from one or more $C_1$-$C_{18}$ alkyl (meth)acrylates, wherein the second polymeric stage has a $T_g$ of below 30° C., and wherein the acrylic copolymer has a weight average molecular weight of $1.5 \times 10^6$ g/mol or more.

8. An article of manufacture comprising the thermoplastic polymer composition of claim 1, wherein the article of manufacture is selected from the group consisting of a film and a sheet.

* * * * *